United States Patent [19]

Drori

[11] 4,181,051
[45] Jan. 1, 1980

[54] METHOD OF MAKING FLUID-ISSUING OPENINGS THROUGH THE WALLS OF FLEXIBLE PLASTIC MEMBERS, PARTICULARLY DRIPPER EMITTERS

[76] Inventor: Mordeki Drori, 89 Zahal St., Kiron, Israel

[21] Appl. No.: 860,193

[22] Filed: Dec. 13, 1977

[51] Int. Cl.² .............................................. B26D 7/14
[52] U.S. Cl. ........................................ 83/19; 83/30; 83/54; 219/121 LM; 239/547
[58] Field of Search ...................... 239/76, 450, 533.13, 239/536, 542, 546, 547, 562, 566–568; 138/45, 46; 83/30, 54, 660, 926 R, 19; 219/121 LM

[56] References Cited

U.S. PATENT DOCUMENTS

| | | | |
|---|---|---|---|
| 2,687,329 | 8/1954 | Hunter | 239/546 X |
| 3,980,104 | 9/1976 | Kabai | 239/547 X |

Primary Examiner—Robert W. Saifer
Attorney, Agent, or Firm—Benjamin J. Barish

[57] ABSTRACT

Described is a method of making fluid-issuing openings through the wall of flexible plastic members, particularly fluid conduits, by forming each opening through a small radius of curvature portion of the conduit wall while the respective wall portion is of curved oblong shape in cross-section, such that during use of the conduit, it assumes a circular shape, thereby increasing the radius of curvature of the wall portion and reducing the cross-sectional area of the outer part of the opening formed therethrough. The method is particularly described for producing linear-source water irrigation emitters which have a smaller sensitivity to clogging, which are easier to clean, and which have a smaller sensitivity to pressure variations in the water supply line.

12 Claims, 17 Drawing Figures

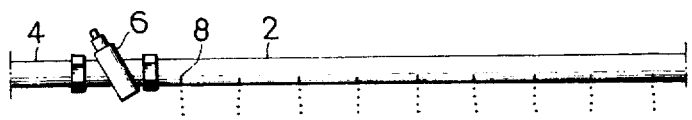
FIG.1
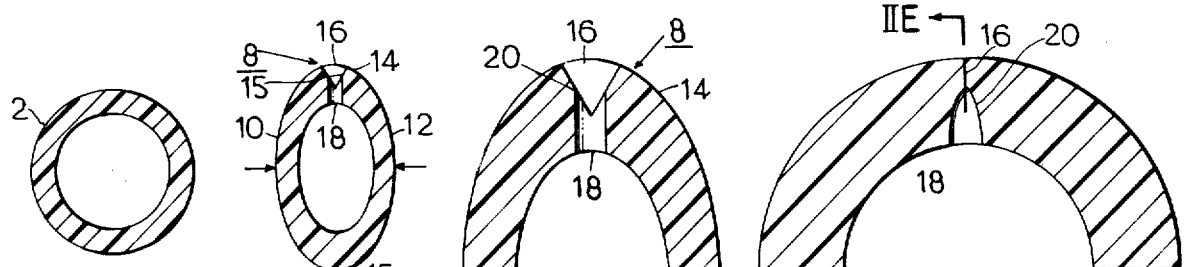
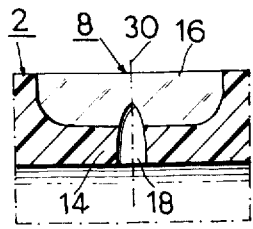
FIG.2a
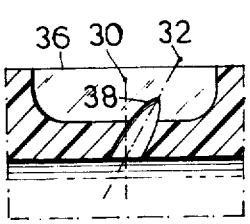
FIG.2b
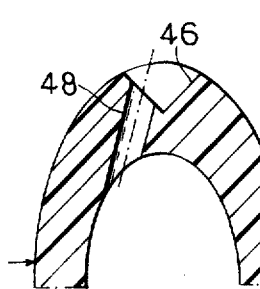
FIG.2c
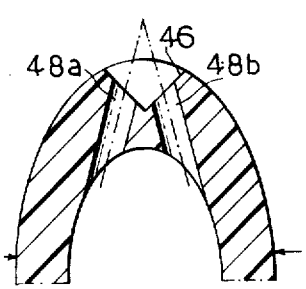
FIG.2d
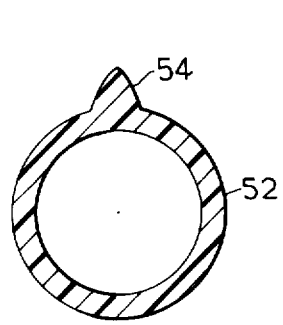
FIG.2e   FIG.3   FIG.4   FIG.4a
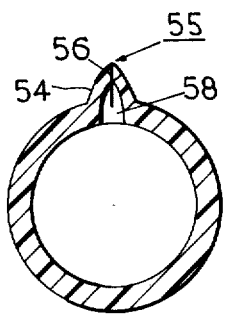
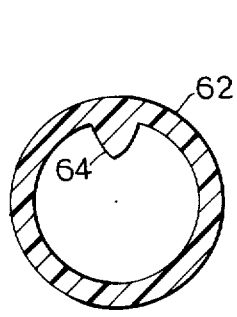
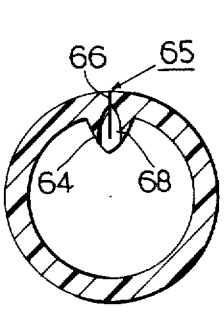
FIG.5a   FIG.5b   FIG.6a   FIG.6b
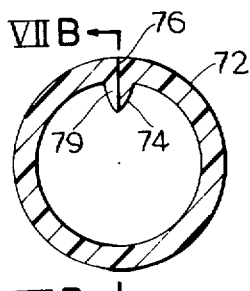
FIG.7a
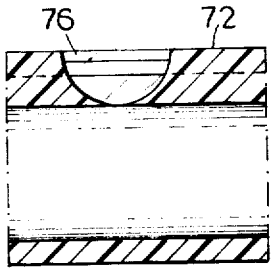
FIG.7b
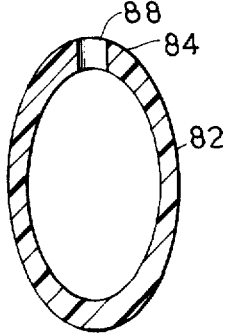
FIG.8a
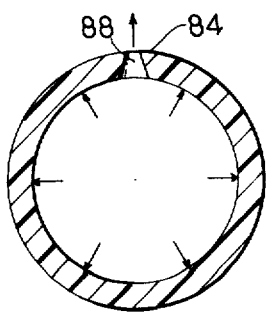
FIG.8b 250,000
METHOD OF MAKING FLUID-ISSUING OPENINGS THROUGH THE WALLS OF FLEXIBLE PLASTIC MEMBERS, PARTICULARLY DRIPPER EMITTERS

BACKGROUND OF THE INVENTION

The present invention relates to a method of making fluid-issuing openings through the walls of flexible plastic members, and to fluid conduits having a plurality of longitudinally spaced openings through its wall for distributing fluid flowing therethrough under pressure. The invention is particularly useful in making the drip emitter openings in a water conduit used for drip irrigation, and it is therefore described below with respect to that application.

One of the newest and most rapidly developing techniques of irrigation is by the use of devices, called drip emitters, which continuously supply a slow dribble or trickle of water to the plants. Most of the known systems use point-source emitters, i.e. separate drip emitter nozzles or heads attached to the water supply pipe. Other systems use linear-source emitters, e.g. arrangements wherein the drip emitter openings are formed in the water supply pipe itself. These openings, however, must be of very small diameter, in the order of 0.5 mm or less, to produce the desired low rate of water emission. Such small diameter openings are easily cloggable by foreign particles in the water supply, and when clogged, they are difficult to clean. Moreover, the rate of water emission through each drip emitter opening varies with the water pressure at that particular opening so that drip emitters upstream of the line, or at higher elevations, emit the water at a higher rate than the emitters downstream of the line, or at lower elevations.

An object of the present invention is to provide a method of making fluid openings through the walls of a flexible plastic member, and particularly to a method of making drip emitter openings through the wall of a water conduit used for drip irrigation, which method produces advantages in one or more of the above respects. Another object of the invention is to provide flexible plastic members, and particularly drip emitter devices, made in accordance with the above method.

SUMMARY OF THE INVENTION

According to one aspect of the present invention, there is provided a method of making drip emitter openings through the wall of a water conduit used for drip irrigation, characterized in forming each opening through a small radius of curvature portion of the conduit wall while the respective wall portion is of curved oblong shape in cross-section, such that during use of the conduit, it assumes a circular shape, thereby increasing the radius of curvature of said wall portion and reducing the cross-sectional area of the outer part of the opening formed therethrough.

In some of the preferred embodiments of the invention described below, the conduit is normally of substantially circular cross-sectional shape, each of the openings being formed while the respective portion of the conduit is squeezed to deform some into said curved oblong shape. More particularly, each of the openings is produced by first forming a longitudinal slit along the outer surface of the respective conduit portion, and then forming a hole through the inner surface of the respective conduit portion to join with the slit, the hole in the undeformed condition of the conduit having a diameter larger than the width and smaller than the length of the slit.

The above preferred method provides a number of advantages which are particularly important when used in producing drip emitter irrigation devices. First, the fluid openings so produced are less susceptable to clogging. This is because the hole portion of the opening may be made of larger diameter than in the conventional apertured conduit type of drip emitter for the same flow rate, since the slit reduces the rate of flow; the slit is also less susceptible to clogging since a particle lodged at one point along its length would still permit the passage of the water through the remaining length of the slit. Another advantage is that should clogging occur, the clogged passageway can usually be cleaned by merely squeezing the wall to again cause the intermediate portion having the opening to bulge outwardly to again decrease its radius of curvature, which opens the passageway and permits the particle to be washed out. Further, fluid openings formed in conduits in accordance with this method tend to produce some regulation in the rate of water flow, as an increase in pressure at the location of the opening causes the radius of curvature of that conduit portion to increase, and thereby the sides of the slit to abut each other with greater force, which reduces the fluid flow through the opening.

According to a still further aspect of the invention, there are provided drip irrigation devices comprising a fluid conduit having a plurality of drip emitter openings each made in accordance with the above method.

While it is preferred that the conduit wall normally be of circular shape and be squeezed to deform same into the oblong shape at the time the openings are formed, as discussed above, it is contemplated that the conduit wall may normally (i.e. when undeformed) be of the curved oblong shape and be formed into a circular shape by the water pressure during use. The latter arrangement also provides some of the advantages of easy cleaning and self-regulation described above with respect to the preferred embodiments, even though it is more susceptible to clogging.

Further, while the invention is preferably applied to providing the drip emitter openings in linear-source water irrigation emitters, other applications of some of the features of the invention will be apparent, such as in dispensing tooth-paste, glue, and the like through an opening in a plastic cap. According to a further aspect of the invention, therefore, there is provided a method of making a fluid opening through the wall of a flexible plastic member, comprising: squeezing opposed portions of the plastic member wall towards each other to deform the member and to cause an intermediate portion of its wall between the squeezed portions to bulge outwardly; forming a slit in the outer surface of the outwardly bulged wall portion; forming a hole through the inner surface of the bulged wall portion to join with the slit, the hole in the undeformed condition of the plastic member having a diameter larger than the width and smaller than the length of the slit; and releasing the plastic member to permit it to return to its indeformed condition.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates an apertured-conduit type of drip irrigation device which the invention is particularly useful in making;

FIGS. 2a-2d illustrate the main steps in making the fluid-emitting openings, i.e. the apertures, in the drip emitter device of FIG. 1;

FIG. 2e is a sectional view along line IIE—IIE of FIG. 2d;

FIGS. 3, 4 and 4a illustrate possible variations in the method for producing the openings;

FIGS. 5a-5b, 6a-6b and 7a-7b illustrate three further variations in the method and in the article so produced; and FIGS. 8a-8b illustrate a still further variation in the present invention.

DESCRIPTION OF SEVERAL PREFERRED EMBODIMENTS

The drip irrigation device illustrated in FIG. 1 is of the linear-source emitter type. It includes a water conduit 2 connected to a water supply line 4 via a pressure-regular 6, the water conduit 2 being formed with drip-emitting openings 8 longitudinally spaced along its length and each of a sufficiently small diameter so as to produce a slow dribble or trickle of water therethrough. As indicated earlier, the conventional techniques for producing the drip emitter openings 8 result in openings which are easily clogged, which are difficult to clean, and which produce non-uniform outputs according to variations in the water pressure at the particular location of the opening in the conduit. The present invention enables the apertured-conduit type of drip irrigation devices to be constructed providing advantages in some or all of the above respects.

FIGS. 2a-2d illustrate the main steps in making each of the fluid openings 8 in the drip emitter device of FIG. 1. Thus, FIG. 2a illustrates the normal (undeformed) condition of a section of the conduit 2 where an opening 8 is to be produced. As shown in FIG. 2b, opposed portions 10, 12 of this section are squeezed towards each other to deform the conduit to a curved oblong or elliptical shape wherein intermediate portions 14, 15 of its wall between the squeezed portions 10, 12 bulges outwardly. A slit 16 is formed in the outer surface of one (or both) of the outwardly bulged wall portions (this being shown in portion 14), and then a hole 18 is formed through the inner surface of the bulged portion to join with slit 16.

FIG. 2c is an enlarged view illustrating the configuration of the opening 8 when so formed and while the conduit is still in its deformed squeezed condition, and FIG. 2d illustrates the shape of opening 8 after the conduit has been released and permitted to return to its normal undeformed condition.

It will be appreciated that when the conduit is deformed as shown in FIGS. 2b and 2c, the outer surface or skin of the conduit is under tension, whereas its inner surface or skin is under compression. Accordingly, when the outer surface is slit, as shown at 16, the outer edges of the slit diverge to produce the V-shaped section of the slit 16 shown in FIGS. 2b and 2c. Hole 18 is then formed through the V-shaped slit 16, preferably from the outer to the inner direction. Now when the conduit is released and permitted to return to its normal undeformed condition as illustrated in FIG. 2d, the outer surface of the conduit wall contracts and closes slit 16. The upper portion of hole 18 also tends to close, thereby producing the curved or conical juncture 20 between the upper end of hole 18 and the lower end of slit 16.

In FIG. 2d, slit 16 is formed of a depth less than the thickness of the bulged wall portion 14 so as to terminate short of its inner surface. Also, the diameter of hole 18 is considerably less than the length of the slit 16, and is considerably larger than the width of the slit in the normal undeformed condition of the conduit wall, as shown in FIG. 2d.

It will thus be seen that in use, the conduit 2 will assume the circular cross-sectional shape of FIGS. 2a and 2d, wherein slit 16 closes but is not sealed, so that it permits a slow dribble of water to issue through it from the interior of the conduit via its respective hold 18. Because of the resistance to the fluid flow imposed by the slit portion 16 of the opening 8, the hole portion 18 of the opening may be of larger diameter than what would normally be required in the conventional drip emitters to produce the desired slow rate of emission. Accordingly, the hole portion 18 of the opening is less susceptible to clogging than in the conventional devices. The slit portion 16 of the opening is also less susceptible to clogging since a particle lodged in one portion of its length will have little effect on the passage of the water through the remaining portion of its length.

The openings 8 formed as described above may also be easily cleaned by merely again squeezing the opposed portions 10, 12 of the conduit adjacent to the respective opening to cause the intermediate portion 14 to bulge outwardly, thereby opening slit 16 and the upper end of hole 18 (as shown in FIG. 2b), whereupon any particles lodged in the hole or slit will usually be washed out. This procedure may be repeated one or more times until the particle is washed out.

Further, the openings 8 made according to the method described above will also produce some flow regulation tending to maintain the rate of water output more constant than conventional holes with variations in the water pressure at the respective openings. This is because a higher water pressure within the conduit at any particular location will tend to cause the conduit to assume a more perfectly circular cross-section which causes the edges of slit 16 at that location to be pressed against each other with greater force, thereby decreasing the flow through the slit.

The above method of forming the openings 8 may be implemented very easily in the apparatus presently used for producing the drip emitter openings in plastic water conduits. The present procedures use laser beams or piercing pins for forming the openings. The above described method may be implemented by merely including rollers and a slitting blade at the piercing station, the roller being effective to squeeze the conduit and hold some squeezed as the blade effects the slit and the laser beam or pin pierces the hold.

FIG. 2e illustrates the hole 18 portion of the opening 8 as being formed along an axis 30 which constitutes a radial line through the wall of conduit 2.

FIG. 3 illustrates a variation wherein the hole portion 38 of the opening is formed along an axis 32 which is at an oblique angle to the radial line 30 through the conduit wall, the hole portion 38 being formed through the inner surface of the conduit and joining with the slit portion 36 of the opening as described above.

FIG. 4 illustrates a still further variation wherein the hole portion 48 of the opening is formed eccentrically with respect to the slit portion 46. FIG. 4a illustrates the provision of two holes 48a, 48b, each passing through one face of the slit 46. It will be appreciated that FIGS. 4 and 4a illustrate the squeezed or deformed condition of the conduit wall, corresponding to the condition illustrated in FIG. 2c.

FIGS. 5a and 5b illustrate a still further variation, wherein the conduit wall 52 includes a protuberance on its outer surface, in the form of a longitudinally extending rib 54, in which the openings 55 (FIG. 5b) are produced. Thus, each opening would include a longitudinal slit 56 formed in the outer surface of rib 54 and a hole 58 formed through the inner surface of the conduit to join with slit 56. The provision of the rib 50 provides an increased contacting surface between the sides of the slits 56.

FIGS. 6a and 6b illustrate a still further variation, wherein the conduit 62 is provided with a protuberance, again in the form of a longitudinally extending rib 64, but in this case, it is formed on the inner surface of the conduit wall. The procedure for making the opening 65 is otherwise the same as described above, wherein the sides of the conduit 62 are squeezed towards each other to cause the portion containing the rib 64 to bulge outwardly, at which time the slit 66 is formed followed by the formation of the hole 68.

FIGS. 7a and 7b illustrate a variation of FIGS. 6a and 6b, in that no hole (comparable to hole 68 in FIG. 6b) is formed through the inner rib 74 of the conduit 72 of FIGS. 7a and 7b, but rather a portion 79 of the rib 74 is removed on one side of its slit 76.

FIGS. 8a and 8b illustrate a further possible variation of the invention. Whereas in the above-described embodiments, the conduit is normally (i.e. when undeformed) of circular cross-section, and is squeezed to produce the curved oblong shape at the time the openings are formed, in the embodiment of FIGS. 8a, 8b the conduit 82 is normally (i.e., in its undeformed condition) in the curved oblong shape (as shown in FIG. 8a) when the fluid openings 88 are formed. For purposes of example, these openings are shown as including the hole portion and not the slit, although of course the slit could also be included. When the conduit is put into use, the high water pressure within the conduit causes it to assume the circular shape, as shown in FIG. 8b, thereby increasing the radius of curvature of the portion of the conduit wall in which the openings 88 are formed and thereby reducing the cross-sectional area of the outer part of the openings 88.

It will be seen that in the embodiment of FIGS. 8a, 8b, the greater the water pressure within the conduit at the portion thereof through which the respective opening 88 is formed, the more circular in shape that portion of the conduit assumes, and the greater will be the reduction in the cross-sectional area of the outer part of the respective opening 88. Accordingly, the arrangement of FIGS. 8a and 8b also effects some flow regulation with variations in pressure. Although this arrangement is more susceptible to clogging than the arrangements including the slit, it facilitates the cleaning of the openings by merely squeezing the portion of the conduit back to the shape illustrated in FIG. 8a, thereby enlarging the opening 88 and permitting clogging particle to be washed therethrough.

Instead of making the conduit of substantially uniform wall thickness, it will be appreciated that the longitudinally extending strip 84 of small radius-of-curvature, through which the openings 88 are formed, may be of substantially greater thickness than the remainder of the conduit wall 82. Thus, the weight and manufacturing cost of the conduit would be minimized by having it constituted mainly of a thin wall section, sufficient to support the pressure of the fluid within the conduit, whereas regulation is still produced by providing the strip (84) with sufficient thickness to permit constriction of the openings (88) when the conduit is pressurized. Such a construction may be produced by extruding the conduit with a non-uniform thickness; or by first extruding a separate strip (84) in the shape illustrated and then bonding same to plastic sheet material forming the remaining, smaller-thickness conduit wall.

It will be appreciated that the illustration of conventional holes for the fluid emiter openings in FIGS. 8a, 8b is purely for purposes of example, and that other shaped holes (e.g. the slit-and-hole configuration of the earlier described figures) could also be used.

While the invention has been described with respect to the formation of drip emitter openings in a water irrigation conduit, this being a preferred embodiment, it will be appreciated that the invention could also be used in other applications such as the formation of openings in toothpaste or glue dispensers.

Also, while in the above-described embodiments, the slit (e.g. 16), when included, preferably terminates short of the inner surface of the conduit, it will be appreciated that it, or a part thereof (e.g. the center part), can pass completely through the conduit wall.

Further variations, modifications and applications of the invention will be apparent.

What is claimed is:

1. The method of making drip emitter openings through the wall of a water conduit used for drip irrigation by forming each opening through a small radius of curvature portion of the conduit wall while the respective wall portion is of curved oblong shape in cross-section, such that during use of the conduit, it assumes a circular shape, thereby increasing the radius of curvature of said wall portion and reducing the cross-sectional area of the outer part of the opening formed therethrough, characterized in that each of said openings is formed by squeezing the conduit wall to deform same, forming a longitudinal slit along the outer surface of the respective conduit portion, and forming a hole through the inner surface of the respective conduit portion to join with said slit, said hole in the undeformed condition of the conduit having a diameter larger than the width and smaller than the length of said slit.

2. The method according to claim 1, wherein said conduit wall is normally of substantially circular cross-sectional shape, each of the openings being formed while the respective portion of the conduit is squeezed to deform same into said curved oblong shape.

3. The method according to claim 1, wherein said slit is formed with a depth less than the thickness of said respective conduit portion.

4. The method according to claim 1, wherein said hole is formed along an axis constituting a radial line through the conduit wall.

5. The method according to claim 1, wherein said hole is formed along an axis oblique to a radial line through the conduit wall.

6. The method according to claim 1, wherein said small radius of curvature portion of the conduit includes an external longitudinally-extending rib, the slit of each of said drip emitter openings being formed in said rib.

7. The method according to claim 1, wherein said small radius of curvature portion of the conduit includes an internal longitudinally-extending rib, the hole of each of said drip emitter openings being formed through said rib.

8. The method according to claim 1, wherein said conduit wall is normally of said curved oblong shape and is formed into a circular shape by the water pressure during use.

9. The method of making a fluid opening through the wall of a flexible plastic member, comprising: squeezing opposed portions of the plastic member wall towards each other to deform the member and to cause an intermediate portion of its wall between the squeezed portions to bulge outwardly; forming a slit in the outer surface of said outwardly bulged wall portion; forming a hole through the inner surface of said bulged wall portion to join with said slit, said hole in the undeformed condition of the plastic member having a diameter larger than the width and smaller than the length of said slit; and releasing the plastic member to permit it to return to its undeformed condition.

10. The method according to claim 9, wherein said slit is formed with a depth less than the thickness of said bulged wall portion so as to terminate at said slit.

11. The method according to claim 9, wherein said outwardly bulged wall portion includes a protuberance on its outer surface, and said slit is formed in said protuberance.

12. The method according to claim 9, wherein said outwardly bulged wall portion includes a protuberance on its inner surface, and said hole is formed in said protuberance.

* * * * *